June 10, 1958 S. BOLLING 2,838,332
DUST RING FOR MIXERS
Filed June 16, 1955 2 Sheets-Sheet 1
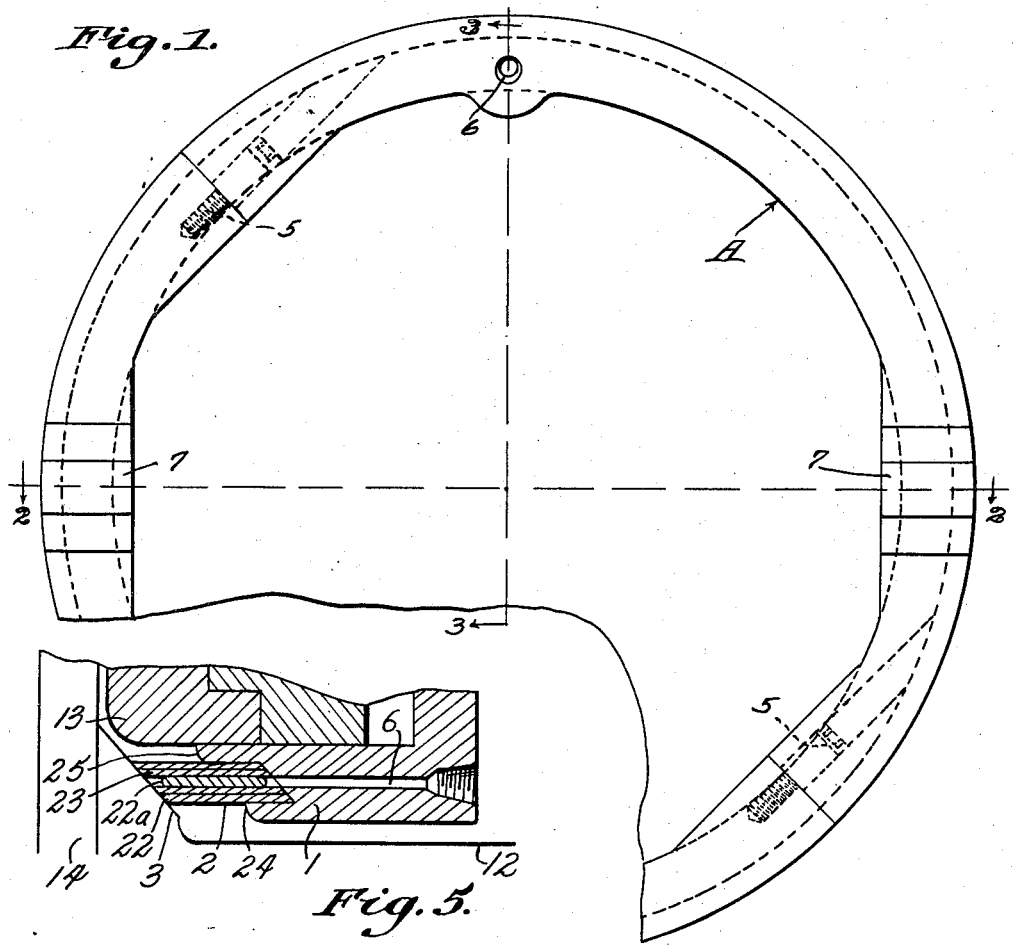
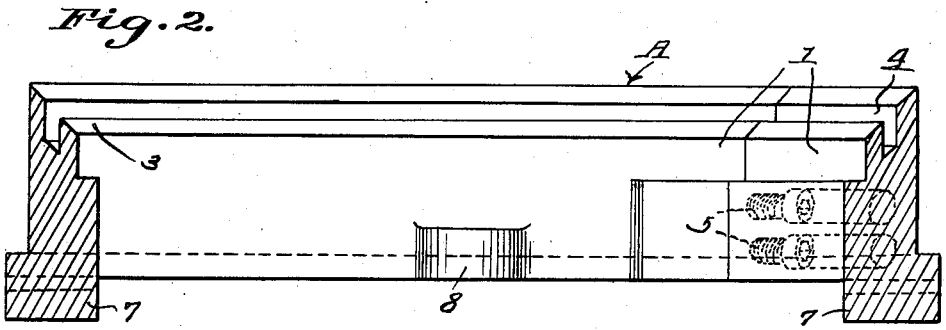
Stewart Bolling
INVENTOR
BY Chrow &Co.
ATTORNEYS.

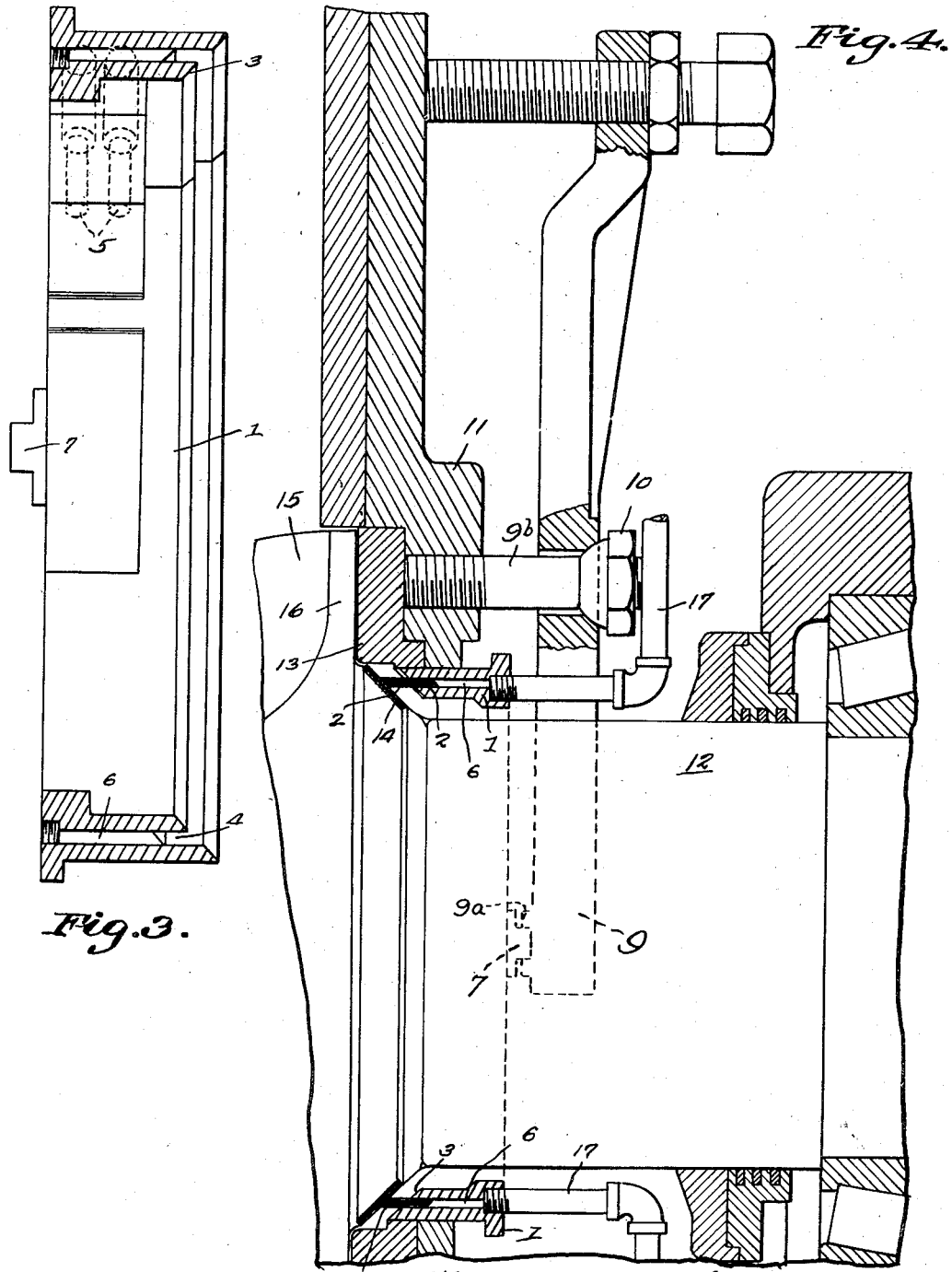

2,838,332

DUST RING FOR MIXERS

Stewart Bolling, Cleveland, Ohio

Application June 16, 1955, Serial No. 516,001

2 Claims. (Cl. 288—2)

This invention relates to a dust ring for mixers, for sealing the openings in pressure vessels around rotating or reciprocating shafts. Although intended primarily as a stuffing box with gland packing for intensive mixers of rubber, plastics, mastics etc., its use is adaptable to other applications requiring seals.

Heretofore, dust rings used for intensive mixers were subject to fouling, which prevented the point of contact, or actual seal from functioning, due to the character of the contents of the mixer which were sticky, abrasive, and would vulcanize or set up with age. This hard use would result in rapid wear, loss of pressure, and frequent replacements of dust rings, which are very costly.

An object of my invention is to provide a dust ring that avoids deterioration and rapid wear, due to fouling and loss of pressure, whether from wear or limited end motion of the rotor.

Another object of this invention is to provide a dust ring, which is simple, convenient to use, and carries a replaceable sealing element.

A further object is to provide a sealing element in the dust ring, of lightest possible weight, that is positive in its action, that is inexpensive and easy to replace.

Another further object is to provide a resilient sealing element that can be force feed lubricated, to compensate for slight wear and adjust to end motion of rotor which is limited and cannot be held positive, and will tighten with increase of pressure.

Other objects and advantages of the invention will become apparent in the body of the specification and claims.

Certain features of the invention are herein illustrated and described.

In the drawings:

Fig. 1 is a plan view of my dust ring,

Fig. 2 is a side elevation, in section, along line 2—2, of the dust ring inverted, Fig. 3 is a side elevation, in section along line 3—3, of the dust ring inverted, Fig. 4 is a side elevation, partly in section, of the dust ring mounted in a rotor shaft opening, and Fig. 5 is an enlarged detail sectional view showing certain of the elements in Fig. 4.

Many schemes have been devised for preventing the material being mixed from extruding trough the seal, vulcanizing, setting up, and fouling such seals, and preventing them from functioning. No lasting, positive seal has ever before been devised and replacement parts have been very expensive to make. My new seal is an improvement over the dust ring for mixers disclosed in the Banbury Patent No. 1,987,659 of January 15, 1935. It serves the same purpose but has many advantages over the older device, which has been widely used on the Banbury mixer.

My dust ring or stuffing box A, Fig. 1, is a split gland ring 1, with sealing element 2. The gland ring in this embodiment is shaped as shown, and is preferably made of cast steel, machine finished to correct dimensions. The gland ring has a bevel 3 of 45 degrees, or as desired, and a circumferential slot 4 therein. It is convenient to make and use this ring 1 in two parts, abutted and held together by hidden bolts 5 in counterbores. On opposed sides of the ring there are forced feed lubrication ducts 6, drilled and tapped to receive lubrication pipe connections. The ducts 6 lead to the bottom of slot 4. The gland ring 1 has opposed upstanding lugs 7. The lugs 7 engage between projections 9a adjacent the end of a single bolt yoke 9, which carries a bolt 9b, and which may be adjusted by the pressure of a fulcrum nut 10. The wide flange 8 has bolt holes to receive holding studs. These can be spring loaded.

The slot 4 has a cone shaped bottom parallel to the bevel 3. In slot 4 is fitted a sealing element 2, composed of three or more concentric rings 22 of resilient metal, preferably of phosphorous bronze strip of about twenty two gauge. These rings, except the middle ring 22a, are cut and have staggered butt joints. These rings 22 are of equal width, of which about half is within the slot 4. The outer edges define a bearing surface as shown at 23, parallel to bevel 3. The middle, or lantern, ring 22a is not as wide and has a space between its ends to receive lubrication under force feed. The edges of slot 4 are rounded as at 24 and 25 so as to permit flexure of the sealing rings.

The sealing element 2 may be composed of one continuous strip wrapped two or more turns under, and two or more turns over the lantern ring, in lieu of the separate concentric rings.

The dust ring A is mounted on the end of the fixed frame 11 of the stationary mixer and projects into the opening around the neck 12 of rotor shaft, adjacent wearing ring 13, with the sealing element 2 bearing against the rotor collar 14 which is hard faced or heat treated to eliminate wear. The gland ring 1 is set up tight, so that the sealing rings push inward and flex under end motion of the rotor. Slight wear of the sealing rings, does not require adjustment. The lubricant, under pressure, around the lantern ring tends to spread the sealing element.

In the mixing chamber 15, where the rotor revolves, the pressure of 15 to 40 lbs./in.$^2$ causes the contents to extrude into the running clearance between the rotor and flange 16 and end of fixed frame 11 with wearing ring 13, up to sealing element 2. This pressure causes sealing element 2 to tightly press against rotor collar 14. Infrequent adjustment inward of the dust ring A, permits a long wear life of the sealing element 2.

To replace the sealing element 2, the lubricating pipes 17 are disconnected, the nuts on holding studs removed, and the dust ring is withdrawn. The worn sealing element 2 is withdrawn and a new one inserted.

The important feature of this invention is that the sealing element is inclined inwardly to the bearing surface on rotor collar, whatever the angle, so that internal pressure tightens the seal. If the rotor collar 14 is flat, or if the sealing element 2 is to contact the cylindrical neck 12 of the rotor shaft, the sealing element 2 is then made up of stamped conical rings.

One embodiment of the invention has been disclosed herein, in detail. However, various modifications of the disclosed device may be made within the scope of the appended claims.

I claim:

1. A dust ring to engage a moving shaft in a closed vessel to seal the opening between the shaft and the vessel, said ring comprising a pair of semi-circular members, means securing said members together to form a complete ring, each member having an arcuate groove extending inwardly from one end thereof to define an annular groove in said ring, said one end of each member being leveled with the bevel inclining inwardly toward the opposite end of each member, the bottom of said annular groove being parallel with said bevel, and a metallic sealing element consisting of several layers of a resilient metal seated in said annular groove.

2. A dust ring to engage a moving shaft in a closed vessel to seal the opening between the shaft and the vessel, said ring comprising a pair of semi-circular members, means securing said members together to form a complete ring, each member having an arcuate groove extending inwardly from one end thereof to define an annular groove in said ring, said one end of each member being beveled with the bevel inclining inwardly toward the opposite end of each member, the bottom of said annular groove being parallel with said bevel, a metallic sealing element consisting of several layers of a resilient material seated in said annular groove, each member having a lubricating duct therein, and means connecting each of said ducts with a source of lubrication supply.

References Cited in the file of this patent

UNITED STATES PATENTS

| | | |
|---|---|---|
| 1,552,666 | Banbury | Sept. 8, 1925 |
| 1,558,587 | Brighouse | Oct. 27, 1925 |
| 2,444,901 | Sloan | July 6, 1948 |
| 2,540,077 | Dunbar et al. | Feb. 6, 1951 |

FOREIGN PATENTS

| | | |
|---|---|---|
| 71,173 | Sweden | Feb. 17, 1931 |